(12) United States Patent  
Choi

(10) Patent No.: US 7,752,841 B2  
(45) Date of Patent: Jul. 13, 2010

(54) VACUUM INTENSIFIER FOR VEHICLE BRAKE

(75) Inventor: Jaeil Choi, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 593 days.

(21) Appl. No.: 11/821,738

(22) Filed: Jun. 25, 2007

(65) Prior Publication Data

US 2008/0007113 A1    Jan. 10, 2008

(30) Foreign Application Priority Data

Jun. 26, 2006    (KR) ................. 10-2006-0057613

(51) Int. Cl.  
*B60T 13/46* (2006.01)  
*B60T 17/02* (2006.01)

(52) U.S. Cl. .......................................... 60/397; 303/12

(58) Field of Classification Search ............... 60/396, 60/397; 303/12  
See application file for complete search history.

(56) References Cited

U.S. PATENT DOCUMENTS 4,531,624 A * 7/1985 Ideta ........................... 60/397  
4,554,786 A * 11/1985 Takeuchi et al. .............. 60/397  
6,976,645 B2 * 12/2005 Ikeda ........................ 239/590

* cited by examiner

*Primary Examiner*—Thomas E Lazo  
(74) *Attorney, Agent, or Firm*—Morgan, Lewis & Bockius LLP

(57) ABSTRACT

The present invention provides a vacuum intensifier for vehicle brake that stably provides enough negative pressure at a predetermined level or more to a brake booster even though the operational condition of engine and the surroundings change, with simple structure and good assemblage.

4 Claims, 4 Drawing Sheets

VACUUM INTENSIFIER FOR VEHICLE BRAKE

CROSS-REFERENCE TO RELATED APPLICATIONS

The present application is based on, and claims priority from, Korean Application Serial Number 10-2006-0057613, filed on Jun. 26, 2006, the disclosure of which is hereby incorporated by reference herein in its entirety.

FIELD OF THE INVENTION

The present invention relates to a brake booster that increases operational force generated by a driver pressing the brake pedal, particularly a technology that stably provides negative pressure for operation of the brake booster.

BACKGROUND OF THE INVENTION

Known brake boosters in the art are vacuum brake boosters using differential pressure between atmospheric pressure and vacuum and compressed air brake boosters using the pressure of compressed air. The vacuum brake booster applies large force to a brake by applying differential pressure between the atmospheric pressure and negative pressure generated in the vacuum pump or the intake manifold of the engine to a power piston in the brake booster.

A vacuum pump requires a specific apparatus, which increases manufacturing cost of a vehicle; therefore, a type of brake booster using the negative pressure generated in the intake manifold of the engine is commonly used.

However, the negative pressure generated in the intake manifold of the engine is not uniform, depending on the operational condition of the engine and the surroundings. Therefore, it was difficult to maintain stable negative pressure for a brake booster.

SUMMARY OF THE INVENTION

Embodiments of the present invention provides a vacuum intensifier for vehicle brake that stably provides enough negative pressure at a predetermined level or more to a brake booster even though the operational condition of the engine and the surroundings change, with a simple structure and good assemblage.

A vacuum intensifier for vehicle brake according to an embodiment of the invention includes a venturi tube with a neck, a negative pressure-intensifying pipe, and a check valve. The venturi tube is disposed between an engine intake manifold and a surge tank to bypass a throttle valve. The negative pressure-intensifying pipe is connected to the neck of the venturi tube at one end and to a vacuum port of a brake booster at the other end. The check valve is installed in the negative pressure-intensifying pipe and includes a piston, springs, a valve seat, and a packing. The piston slides in the air flow direction in the negative pressure-intensifying pipe. The springs elastically push the piston toward the brake booster in the air flow direction in the negative pressure-intensifying pipe. The valve seat restricts movement range of the piston that is moved by the force of the springs. The packing maintains airtightness between the piston and valve seat on the valve seat.

An end of the negative pressure-intensifying pipe is vertically connected to the downside of the venturi tube at the neck.

The check valve is inserted at the vertical joint of the negative pressure-intensifying pipe and the venturi tube. An end of the spring is inserted in a spring groove formed at the neck of the venturi tube. A hole connecting the negative pressure-intensifying pipe with the inside of the venturi tube is formed in the spring groove. The piston is formed in a bowl shape to insert the spring in the piston. The valve seat is integrally formed at end of a cylindrical member surrounding the piston, in a ring shape that bends inside perpendicular to the outside of the cylindrical member. The packing is formed in a ring shape having a C-shaped cross-section and inserted inside the valve seat.

The cylindrical member has a wedge formed by bending a part of the cylindrical part to protrude outside and a locking groove where the wedge is locked is formed on the negative pressure-intensifying pipe.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Figure 1:
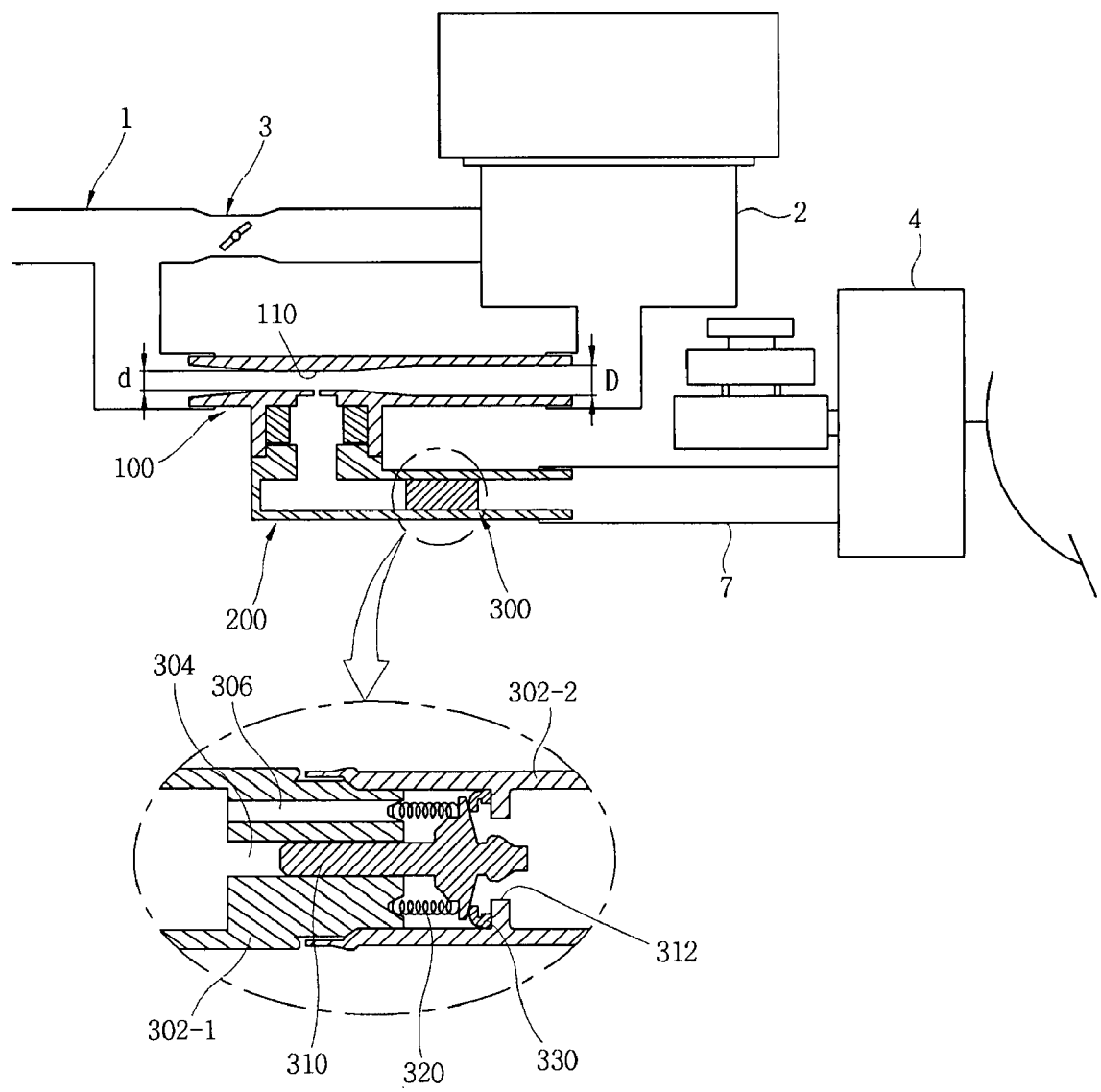
FIG. 1 is a view showing a vacuum intensifier for a vehicle brake according to an embodiment of the invention.
Figure 3:
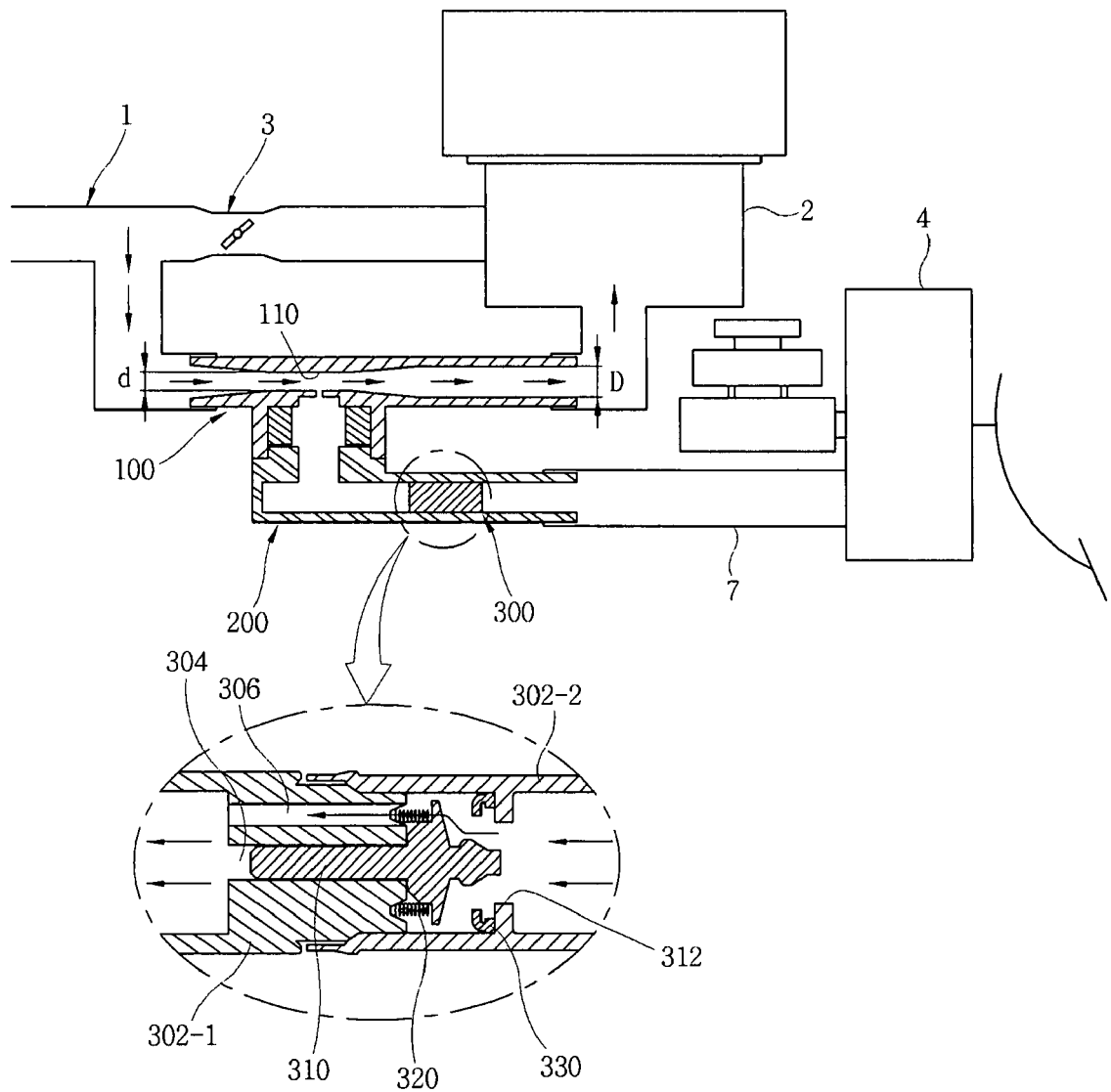

Referring to FIGS. 1 and 3, a vacuum intensifier for vehicle brake according to an embodiment of the invention includes: a venturi tube 100 with a neck 110 that is disposed between an engine intake manifold 1 and a surge tank 2 to bypass a throttle valve 3; a negative pressure-intensifying pipe 200 that is connected to neck 110 of venturi tube 100 at one end and to a vacuum port 7 of a brake booster 4 at the other end; and a check valve 300 installed in negative pressure-intensifying pipe 200 and including a piston 310 that slides in the air flow direction in negative pressure-intensifying pipe 200, springs 320 that elastically push piston 310 toward brake booster 4 in the air flow direction in negative pressure-intensifying pipe 200, a valve seat 312 that restricts movement range of piston 310 moved by the force of springs 320, and packing 330 that maintains airtightness between piston 310 and valve seat 312 on valve seat 312.

As shown in FIG. 1, venturi tube 100 has diameters D and d at both ends and at neck 110, respectively, and is designed such that air passing through neck 110 increases in velocity with decrease in pressure by variation in cross-sectional area.

Air flowing to the engine through the venturi tube appears relatively high negative pressure at neck 110 and the negative pressure is transferred to negative pressure-intensifying pipe 200.

An end of negative pressure-intensifying pipe 200 is vertically connected to the downside of venturi tube 100 at neck 110 and check valve 300 is inserted in negative pressure-intensifying pipe 200 in this embodiment.

Check valve 300 is formed by two joined valve bodies 302. The left valve body 302-1 in FIGS. 1 to 3 has a guide hole 304 guiding piston 310 that is slidably inserted and a flow hole 306 allowing air to flow. Further, springs 320 are disposed between valve body 302-1 and piston 310.

As for the right valve body 320-2, valve seat 312 protrudes inside and packing 330 is in close contact on the left side of valve seat 312 such that piston 310 pushed by springs 320 stably blocks negative pressure-intensifying pipe 200 through packing 330 with valve seat 312.

Figure 2:
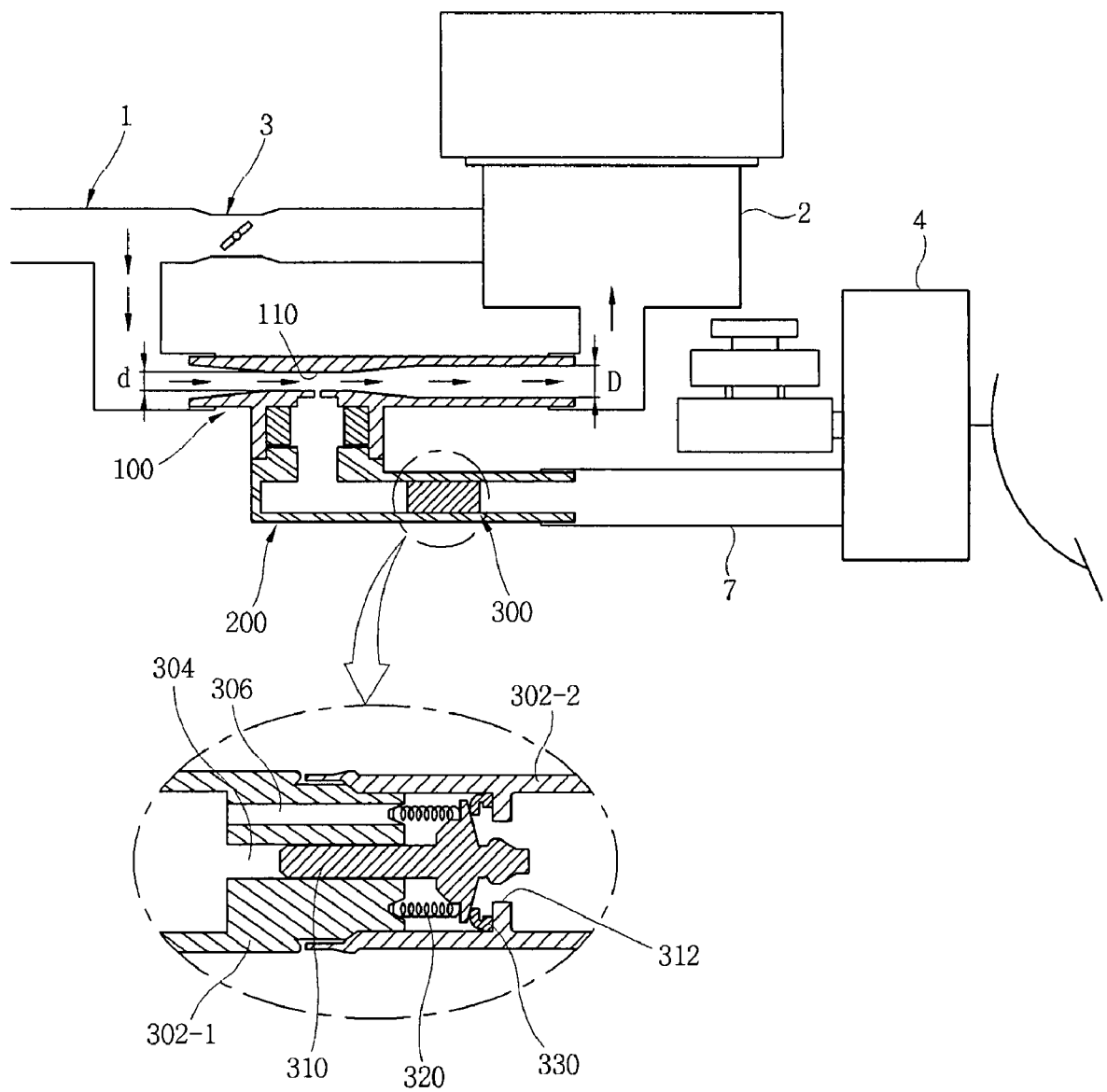
FIGS. 2 and 3 are views illustrating the operation of a vacuum intensifier for vehicle brake according to an embodiment of the invention.

Therefore, when negative pressure of brake booster 4 is larger than the negative pressure at neck 110 of venturi tube 100, negative pressure-intensifying pipe 200, as shown in FIG. 2, is blocked by piston 310 that is pushed by springs 320 with the packing 330 and valve seat 312 and the negative pressure of brake booster 4 is kept stable, not released outside, which allows effective braking accordingly.

On the contrary, when the negative pressure of brake booster 4 is smaller than the negative pressure at neck 110 of venturi tube 100, piston 310 compresses springs 320, as shown in FIG. 3, because the pressure at brake booster 4 is larger than that at neck 110, and negative pressure-intensifying pipe 200 is opened. As a result, the negative pressure at neck 110 of venturi tube 100 is transferred to brake booster 4.

Therefore, brake booster 4 is always provided enough negative pressure, so that it allows effective braking. For reference, arrows in the figures indicate the air-flow direction.

Figure 4:
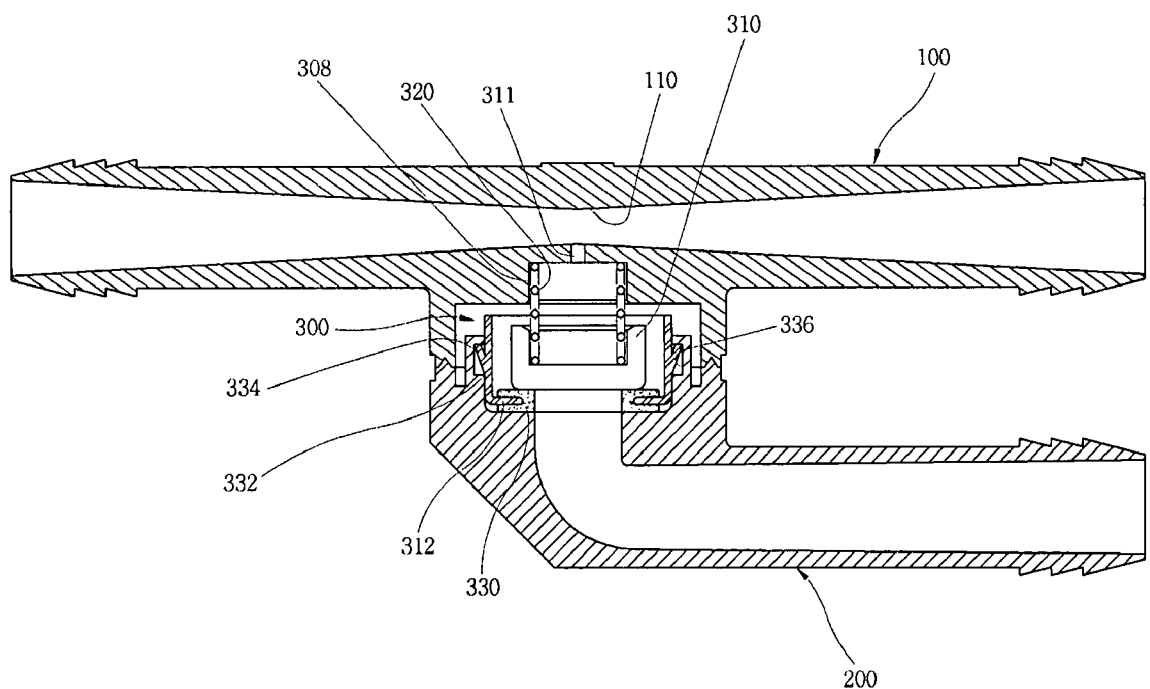
FIG. 4 is a view showing another embodiment of the invention.

FIG. 4 shows another embodiment of the invention that is different from the embodiment shown in FIGS. 1 to 3 in the configuration of check valve 300 and the connection of venturi tube 100 and negative pressure-intensifying pipe 200. The components having the same function are denoted by the same reference numerals.

Check valve 300 according to this embodiment is inserted at the vertical joint of venturi tube 100 and negative pressure-intensifying pipe 200.

An end of spring 320 is inserted in a spring groove 308 formed at neck 110 of venturi tube 100 and a connection hole 311 that connects negative pressure-intensifying pipe 200 with the inside of venturi tube 100 is formed in spring groove 308.

Piston 310 is in a bowl shape to accommodate spring 320, so that the lower end of spring 320 with the upper end in spring groove 308 is inserted in piston 310.

Valve seat 312 is integrally formed at an end of a cylindrical member 332 surrounding piston 310, in a ring shape that bends inside perpendicular to the outside of cylindrical member 332. Packing 330 is formed in a ring shape having a C-shaped cross-section and fitted inside valve seat 312.

Cylindrical member 332 has a wedge 334 that is formed by bending a part of cylindrical member 332 to protrude outside and a locking groove 336 to lock wedge 334 is formed on negative pressure-intensifying pipe 200.

The assembly process of the vacuum intensifier for vehicle brake according to this embodiment is as follows.

As cylindrical member 332 with packing 330 is inserted into negative pressure-intensifying pipe 200, wedge 334 is locked in locking groove 336 and cylindrical member 332 is connected to negative pressure-intensifying pipe 200.

After piston 310 with the lower end of spring 320 inserted therein is disposed in cylindrical member 332 connected to negative pressure-intensifying pipe 200, negative pressure-intensifying pipe 200 is connected to the downside of venturi tube 100 such that the upper end of spring 320 is fitted in spring groove 308 and then the assembly is finished by applying adhesion or fusion to the joint.

As described above, the assembly according to this embodiment is simple with a simple structure, so that the assemblage of the vacuum intensifier for brake is improved with low manufacturing cost.

The operation of this embodiment is the same as the first embodiment and not described.

As described above, the present invention provides a vacuum intensifier for vehicle brake that stably provides enough negative pressure at a predetermined level or more to a brake booster even though the operational condition of the engine and the surroundings change, with a simple structure and good assemblage.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vacuum intensifier for vehicle brake comprising:
   a venturi tube with a neck that is disposed between an engine intake manifold and a surge tank to bypass a throttle valve;
   a negative pressure-intensifying pipe that is connected to the neck of the venturi tube at one end and to a vacuum port of a brake booster at the other end; and
   a check valve installed in the negative pressure-intensifying pipe and including a piston that slides in the air flow direction in the negative pressure-intensifying pipe, springs that elastically push the piston toward the brake booster in the air flow direction in the negative pressure-intensifying pipe, a valve seat that restricts movement range of the piston that is moved by force of the springs, and packing that maintains airtightness between the piston and valve seat on the valve seat.

2. The vacuum intensifier as set forth in claim 1, wherein an end of the negative pressure-intensifying pipe is vertically connected to the downside of the venturi tube at the neck.

3. The vacuum intensifier as set forth in claim 2, wherein the check valve is inserted at the vertical joint of the negative pressure-intensifying pipe and the venturi tube,
   an end of the spring is inserted in a spring groove formed at the neck of the venturi tube,
   a hole connecting the negative pressure-intensifying pipe with the inside of the venturi tube is formed in the spring groove,
   the piston is formed in a bowl shape to insert the spring in the piston,
   the valve seat is integrally formed at end of a cylindrical member surrounding the piston, in a ring shape that bends inside perpendicular to the outside of the cylindrical member, and
   the packing is formed in a ring shape having a C-shaped cross-section and inserted inside the valve seat.

4. The vacuum intensifier as set forth in claim 3, wherein the cylindrical member has a wedge formed by bending a part of the cylindrical part to protrude outside and a locking groove to lock the wedge is formed on the negative pressure-intensifying pipe.

* * * * *